(12) United States Patent
Hawkins

(10) Patent No.: US 7,640,949 B2
(45) Date of Patent: Jan. 5, 2010

(54) SEALING DEVICE

(76) Inventor: David Frederick Hawkins, Unit 2 Heathrow Interchange Park, Bullsbrook Road, Hayes, Middlesex UB4 0JR (GB)

( * ) Notice: Subject to any disclaimer, the term of this patent is extended or adjusted under 35 U.S.C. 154(b) by 0 days.

(21) Appl. No.: 11/997,615

(22) PCT Filed: Aug. 1, 2006

(86) PCT No.: PCT/GB2006/002871

§ 371 (c)(1),
(2), (4) Date: Mar. 27, 2008

(87) PCT Pub. No.: WO2007/015085

PCT Pub. Date: Feb. 8, 2007

(65) Prior Publication Data

US 2008/0231001 A1    Sep. 25, 2008

(30) Foreign Application Priority Data

Aug. 1, 2005   (GB) .................... 0515783.9

(51) Int. Cl.
*F16L 55/10*   (2006.01)
(52) U.S. Cl. ............................ 138/89; 138/90; 220/238
(58) Field of Classification Search .......... 138/89, 138/90; 220/236–238
See application file for complete search history.

(56) References Cited

U.S. PATENT DOCUMENTS

| | | | | |
|---|---|---|---|---|
| 2,607,370 A * | 8/1952 | Anderson | ............. | 138/90 |
| 2,855,003 A * | 10/1958 | Thaxton | ............. | 138/90 |
| 2,870,794 A * | 1/1959 | Thaxton | ............. | 138/90 |
| 3,323,551 A * | 6/1967 | Bell et al. | ............. | 138/90 |
| 4,385,643 A * | 5/1983 | Noe | ............. | 138/90 |
| 4,390,042 A | 6/1983 | Kucherer et al. | | |
| 4,474,216 A * | 10/1984 | Noe | ............. | 138/89 |
| 4,602,500 A * | 7/1986 | Kelly | ............. | 73/49.8 |
| 4,760,868 A * | 8/1988 | Saxon | ............. | 138/89 |
| 5,437,310 A | 8/1995 | Cunningham | | |
| 5,797,431 A * | 8/1998 | Adams | ............. | 138/89 |
| 5,933,556 A | 8/1999 | Hawkins | | |
| 6,170,530 B1 * | 1/2001 | Steblina | ............. | 138/89 |
| 6,851,642 B2 * | 2/2005 | Wilson et al. | ............. | 242/527.1 |
| 7,124,779 B2 * | 10/2006 | Syse | ............. | 138/89 |

(Continued)

FOREIGN PATENT DOCUMENTS

DE    3801620 A1    4/1989

(Continued)

OTHER PUBLICATIONS

UK Patent Office Search Report for corresponding British priority application No. GB 0515783.9, mailed Nov. 9, 2005.

(Continued)

*Primary Examiner*—Patrick F Brinson
(74) *Attorney, Agent, or Firm*—Heslin Rothenberg Farley & Mesiti P.C.

(57) ABSTRACT

The invention provides a plug for sealing an end of a duct. The plug includes a sealing member for sealing against an interior surface of the duct, and gripping means having one or more teeth for gripping the interior surface of the duct. The plug may include a pair of opposed camming surfaces arranged for relative axial movement therebetween whereby the relative axial movement results in the teeth of the gripping means being urged radially outwardly into gripping engagement with the interior surface of the duct.

24 Claims, 3 Drawing Sheets

U.S. PATENT DOCUMENTS 7,314,065 B1 * 1/2008 Adelman .................... 138/89

FOREIGN PATENT DOCUMENTS

| | | |
|---|---|---|
| EP | 0108590 B1 | 11/1986 |
| GB | 1357796 | 6/1974 |

OTHER PUBLICATIONS

International Search Report for corresponding PCT application No. PCT/GB2006/002871, published Mar. 29, 2007.

International Preliminary Report on Patentability (IPRP) for corresponding PCT application No. PCT/GB2006/002871.

* cited by examiner

SEALING DEVICE

CROSS REFERENCE TO RELATED APPLICATIONS

This application is a §371 national stage filing of PCT International Application No. PCT/GB2006/002871, filed on Aug. 1, 2006 and published in English on Feb. 8, 2007 as WO 2007/015085, which claims priority from British application number GB 0515783.9, filed on Aug. 1, 2005. The entire disclosures of these applications are incorporated herein by reference.

FIELD OF THE INVENTION

This invention relates to a plug for insertion into an end of a duct to provide a sealed closure for the duct. More particularly, the invention provides a plug for inserting into an end of a duct used to carry fibre-optics cables.

BACKGROUND OF THE INVENTION

Fibre-optics cables are in wide-spread use for carrying telecommunications signals. A number of methods commonly used to create fibre optics telecommunications networks involve first establishing a network of ducts between required locations and then introducing the fibre optics cables into the network of ducts using techniques such as the "blown fibre" and "blown cable" methods. These methods involve driving the fibre optic cable along the duct with compressed air, for example as described in EP 0108590 (British Telecommunications). In order for such methods to work efficiently, it is desirable that the network of ducts should be sufficiently gas-tight to enable maintenance of the gas pressures needed to convey the cables along the ducts. For this reason, open ends of ducts at terminal locations on the network are typically fitted with plugs (end-stops) that have seals to prevent or limit the escape of gas. The end-stops also serve to prevent foreign objects or materials (e.g. dust and small creatures) from passing into the network.

SUMMARY OF THE INVENTION

The present invention provides an improved end-stop for a cable duct.

Accordingly, in a first aspect, the invention provides a plug for sealing an end of a duct; the plug comprising a sealing member for sealing against an interior surface of the duct; and gripping means comprising one or more teeth for gripping the interior surface of the duct; the plug having a pair of opposed camming surfaces arranged for relative axial movement therebetween whereby the relative axial movement results in the teeth of the gripping means being urged radially outwardly into gripping engagement with the interior surface of the duct.

The duct is typically a duct of the type used for carrying fibre-optics communications cables, and more preferably ducts used in the constructions of blown fibre installations. The duct, which is typically formed from a plastics material, usually has a circular cross section.

The term "gripping" as used herein refers to an action in which a gripping element or member digs, bites or impresses into a surface. It is not intended to cover a mere frictional engagement with the interior surface of the type that might be encountered with, for example, an elastomeric seal. The gripping member is therefore provided with one or more gripping teeth, the term "teeth" as used herein referring to a structure having a point, edge, ridge or protuberance that can cut into or impress the interior wall of the duct to anchor the teeth in the wall.

The gripping means may be present on a main body portion of the plug, or on a separate gripping member, or on both.

The opposed camming surfaces are present on two separate components of the plug, the two components being arrangement for relative axial movement therebetween. Although both of the camming surfaces may be movable, more usually one of the camming surfaces is fixed and the other is movable. The camming surfaces may each be inclined relative to the axis of the plug. Alternatively, only one of the camming surfaces may be inclined, the other surface functioning as a cam follower. In one embodiment, both of the camming surfaces are substantially frustoconical in shape, one of the surfaces being radially inwardly facing and the other of the surfaces being radially outwardly facing.

The sealing member is typically an annular seal formed from an elastomeric material. The sealing member may take various forms. In one form, the sealing member comprises one or more "O-rings", more typically only a single "O-ring". In another form, the sealing member is cylindrical.

The plug may have a main body portion in the form of a shaft for insertion into the end of the duct, and a head portion connected to the shaft which head portion, in use, protrudes from the end of the duct. Relative axial movement of the two opposed camming surfaces is preferably brought about by axial movement of the shaft.

The sealing member may be positioned at or adjacent an axially innermost end of the shaft.

In one embodiment, the shaft has an enlarged inner end portion, the enlarged inner end portion having an annular groove in the radially outer surface thereof in which is mounted a sealing member such as an O-ring.

In another embodiment, the shaft is provided with a pair of axially spaced apart compression members each extending radially outwardly from the shaft, one of the compression members being fixed relative to the shaft and the other being slidable with respect to the shaft; a sealing member (e.g. of cylindrical form) being mounted about the shaft between the two compression members so that axial movement of the shaft compresses the sealing member between the two compression members to deform the sealing member into sealing contact with the interior wall of the duct. Typically the axially innermost of the two compression members is fixed with respect to the shaft and the axially outermost compression member, i.e. the compression member nearest the end of the duct, is slidable with respect to the shaft.

The shaft can be provided with a camming surface by virtue of the profile of the shaft itself; i.e. the camming surface is integrally formed; or the shaft may have a camming member mounted thereon. The camming member may be movably (e.g. slidably) mounted on the shaft, or it may be fixedly mounted on the shaft, for example by adhesive bonding, welding, fusion, friction fit or a snap fit, for example. The camming member may, for example, have a frustoconical camming surface. In one embodiment, the camming member also functions as a compression member as hereinbefore defined, one surface of the camming member functioning as a camming surface and another surface of the camming member serving as a compression surface for compressing the sealing member. The compression surface may be inclined relative to the axis of the shaft or substantially perpendicular thereto.

The gripping member may be concentrically arranged about the shaft or it may be eccentrically arranged with respect to the shaft.

In one embodiment, the gripping member takes the form of a gripping collar or collet which encircles the shaft, the collet having a radially inwardly facing camming surface and a radially outwardly facing gripping surface, whereby axial movement of the shaft urges a camming surface of the camming member against the camming surface on the collet thereby to force the gripping surface of the collet outwardly and into gripping engagement with the interior surface of the duct.

The axial movement of the shaft can be brought about by means of a threaded connection between two components of the plug, or by means of a plunger mechanism. For example, a screw cap or collar can be mounted on an external end (e.g. head portion) of the shaft, rotation of the screw cap or collar serving to bring about the axial movement.

The complementary camming surfaces may be configured such that the gripping member is urged into gripping engagement with the interior surface of the duct as the shaft is moved in a direction towards the end of the duct.

Alternatively, the complementary camming surfaces may be configured such that the gripping member is urged into gripping engagement with the interior surface of the duct as the shaft is moved in a direction away from the end of the duct.

In one particular embodiment, the shaft has a head portion extending axially outwardly from the end of the duct, and a screw collar mounted on the head portion, rotation of the screw collar serving to being about axial movement of the shaft in a direction towards the end of the duct.

As an alternative to a screw collar mechanism, the shaft may take the form of a plunger which is pushed into the duct, the axial motion of the shaft as it is pushed into the duct serving to bring the two camming surfaces together so that the gripping teeth of the gripping means are urged radially outwardly into gripping engagement with the interior surface of the duct. In this embodiment, a camming member may be aligned alongside the shaft inside the duct. The camming member may be offset from the axis of the plug and may, in use, contact the wall of the duct over a proportion of its circumference. The camming member may be provided with one or more gripping teeth and thereby may constitute all or part of the gripping means. Alternatively, the camming member may have no teeth and thus does not function as a gripping member—which case, one or more teeth associated with or present on the shaft may constitute the gripping means. Preferably, however, both the shaft and the camming member are provided with one or more teeth. In this embodiment, confronting surfaces of the camming member and shaft may be configured to provide a ratchet mechanism whereby the shaft can be moved from a first position, in which the gripping means does not exert a gripping effect, to a second position, in which the camming surfaces engage to urge the gripping teeth into gripping contact with the interior surface of the duct.

The plug is preferably provided with means for visually indicating when the plug is in a gripping configuration and when the plug is in a non-gripping configuration. Such means can take the form of, for example, one or more edges or surfaces on a pair of relatively movable parts of the plug that move into alignment when the plug is in one (i.e. gripping or non-gripping) configuration and out of alignment when the plug is in an opposite configuration.

In one embodiment, the head portion and screw collar are configured such that when the plug is in a non-gripping configuration, the head portion is recessed relative to the screw collar and, when the plug is moved into a gripping configuration, the head portion is substantially flush with the screw collar.

In another embodiment, when the axial movement of the shaft is brought about by means of a plunger mechanism, the plunger is configured to move between a protruding position indicative of the plug being in a non-gripping configuration and a non-protruding position indicative of the plug being in a gripping configuration.

In one preferred form of the invention, the plug comprises a shaft for insertion into the end of the duct; the shaft having a compression member at or adjacent the innermost end thereof; a head portion at the outermost end thereof; a camming member being provided on the shaft between the head portion and the compression member; a sealing member disposed about the shaft for sealing against an interior surface of the duct, the sealing member being positioned between the compression member and the camming member; and a gripping member having one or more teeth for gripping the interior surface of the duct, the gripping member being positioned between the camming member and the head portion of the shaft; the camming member and the gripping member being provided with complementary camming surfaces such that axial movement of the shaft brings the complementary camming surfaces together to force the gripping member into gripping engagement with the duct interior and such that the sealing member is compressed between the compression member and a surface of the camming member facing away from the camming surface thereof so that the compression member is deformed into sealing engagement with the duct interior wall.

In another preferred form of the invention, the plug comprises a shaft for insertion into the end of the duct a portion of the shaft having one or more gripping teeth thereon; a sealing member disposed about an enlarged inner end portion of the shaft for sealing against an interior surface of the duct; and a gripping member having one or more teeth for gripping the interior surface of the duct; the shaft and the gripping member being provided with complementary camming surfaces such that axial movement of the shaft results in the gripping member and the teeth on the shaft being urged into gripping engagement with the interior surface of the duct, whereby the shaft has a plunger head at its outermost end and the plunger head is pushed to bring about axial movement of the shaft.

Further particular and preferred embodiments and aspects of the invention will be apparent from the specific description set out below and illustrated in the drawings.

DETAILED DESCRIPTION OF THE INVENTION

The invention will now be illustrated, but not limited, by reference to the specific embodiments shown in the accompanying drawings, FIGS. 1 to 5.

Figure 1:
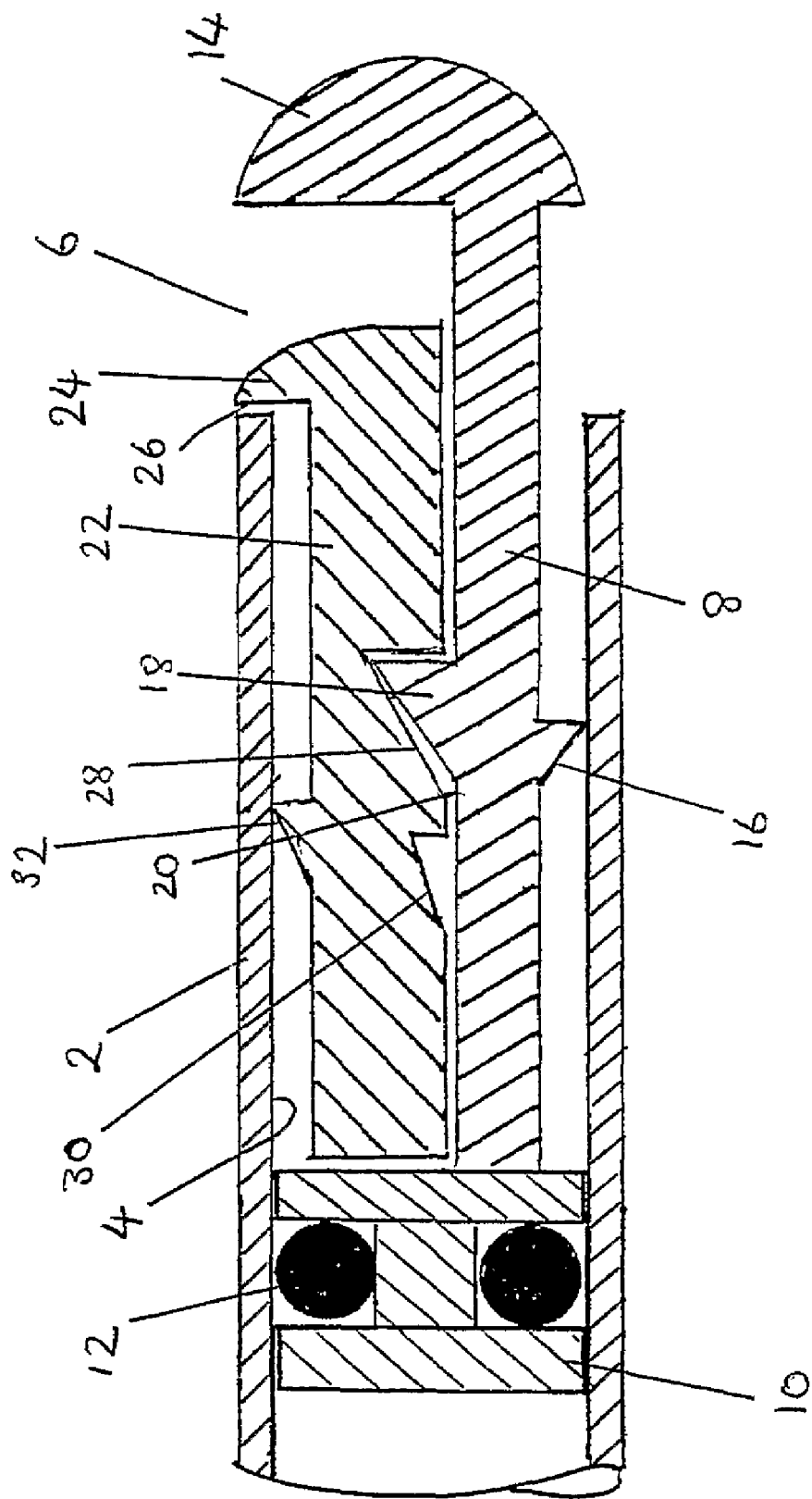
FIG. 1 is a side sectional elevation through an end of a duct containing a plug according to one embodiment of the invention.
Figure 3:
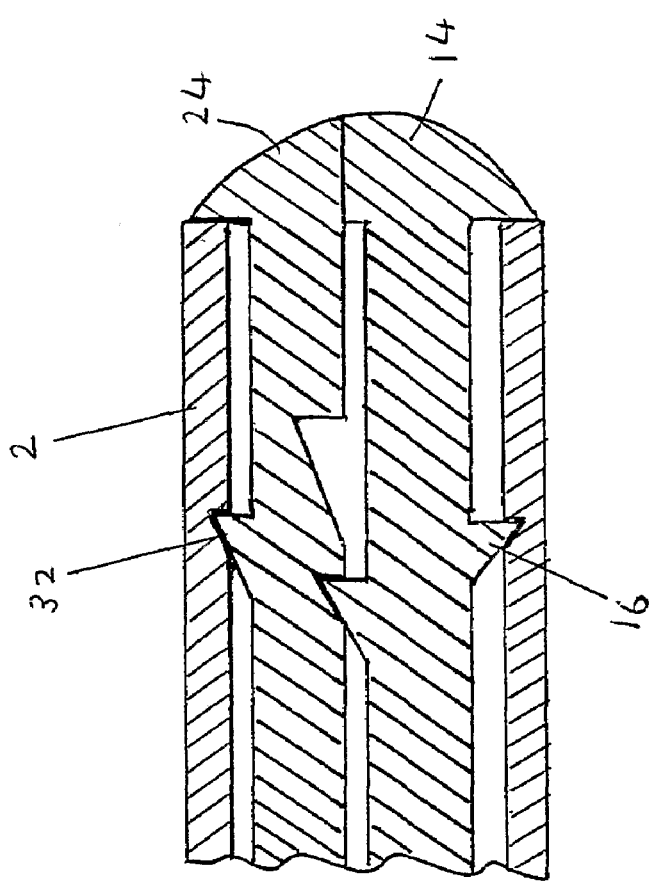
FIG. 3 is a side sectional elevation showing the plug of FIGS. 1 and 2 in a gripping position.
Figure 2:
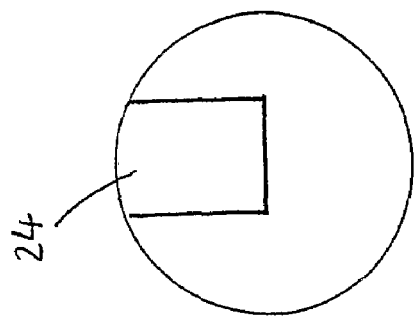
FIG. 2 is a view from direction D in FIG. 1.

FIGS. 1 to 3 show a plug according to one embodiment of the invention for inserting into an end of a conduit duct of the type used in fibre optics cable assemblies. The duct 2 is typically formed from a flexible plastics material and will usually have a smooth interior surface 4.

A plug according to the invention, generally designated by the numeral 6, is inserted into the end of the duct. The plug 6 has a shaft 8 which has a piston portion 10 at its innermost end, the piston portion 10 having an annular recess for accommodating an O-ring sealing member 12. The outermost end of the shaft 8 has a mushroom-shaped portion 14. The shaft 8 also has one or more gripping teeth 16 (only one is shown for simplicity) and a camming portion 18 with an angled camming surface 20.

Also disposed within the end of the duct is a camming member 22, which sits alongside the shaft 8. The camming member has an outermost portion 24 which is of a size to sit within the slot in the mushroom-shaped portion 14 of the shaft. The outermost portion 24 has a radially extending edge 26 that acts as a stop and prevents the camming member 22 from being moved further into the duct. The gripping member has a saw-tooth shaped recess 28 which, in the non-gripping position, receives the camming portion 18 of the shaft. A second shallower saw tooth recess 30 in the surface of the camming member 22 is provided further along the camming member. The outer surface of the camming member 22 has one or more teeth 32. In FIG. 1, the tooth 32 is shown as being in contact with the interior surface 4 of the duct but at this stage does not bite into the surface.

In the configuration shown in FIG. 1, a seal is created between the O-ring 12 and the interior surface 4 of the duct, but the teeth on the camming member 22 and the teeth 16 on the shaft only lightly grip the surface 4.

The shaft 8 acts as a plunger, such that, when the mushroom-shaped portion 14 is pushed into the duct, the shaft moves whereby the camming surface 20 of the camming portion 18 cams along the complimentary camming surface of the saw-tooth recess 28. This has two effects. Firstly, it forces the shaft 8 outwardly (downwardly in the drawing) so that the tooth 16 bites into the interior surface 4 of the duct. Secondly, the camming member 22 is forced outwardly so that the tooth 32 is urged into gripping engagement with the interior surface 4.

As can be seen from FIG. 3, the shaft 8 is pushed along the duct until the camming portion 18 snaps into the shallower saw-tooth recess 30. At this point, the plug is firmly locked in place. The angle of the teeth is such that any attempt to remove the plug results in the teeth gripping the interior surface even more tightly. The shaft and camming member thus form a ratchet mechanism.

It will also be appreciated from FIG. 2 that in the fully sealed gripping position, the outer curved surface of the outermost portion 24 of the camming member is flush with the curved outer surface of the mushroom-shaped portion 14 of the shaft, thereby providing a visual indication that the plug has been correctly installed.

Figure 4:
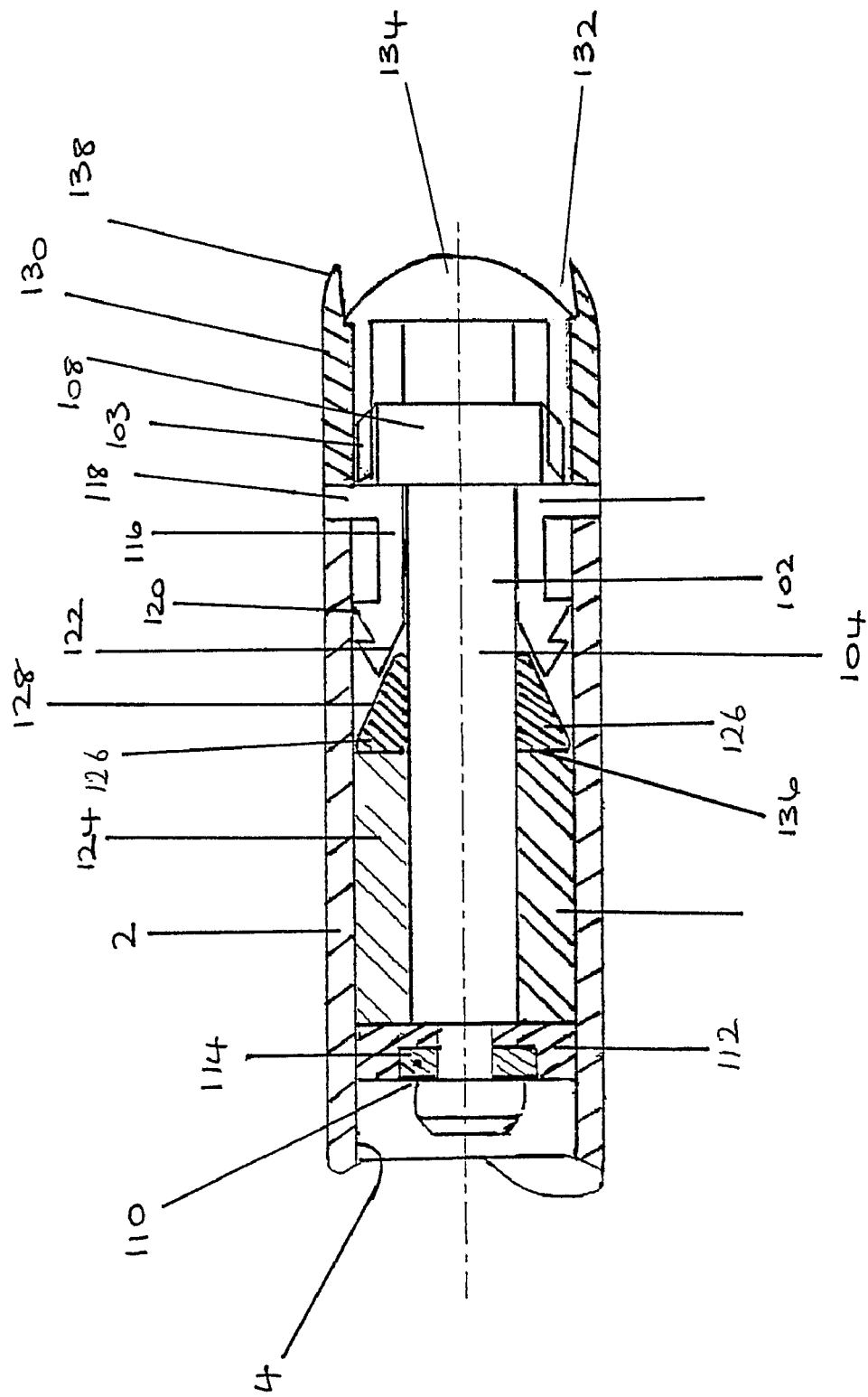
FIG. 4 is a side sectional elevation showing an end of a duct containing a plug according to a second embodiment of the invention.

The plug according to a second embodiment of the intervention is shown in FIGS. 4 and 5. In this embodiment, the plug 102 comprises a shaft portion 104, having an outermost head portion 108 which bears an external thread 103. The innermost end of the shaft 104 has an amular groove 110 in which is seated a washer 112. The washer 112 is held in place by means of retaining washer or circlip 114.

A collet 116 sits inside the mouth of the duct, a flange 118 of the collet resting against the end surface of the duct and preventing the collet from being pushed into the duct. The collet has a gripping portion comprising teeth 120, the radially inner surface of the gripping portion being inclined so that it forms a camming surface 122.

Positioned between the collett 116 and the washer 112 are a sealing member 124 and a frustoconical washer 126 which functions both as a camming member and a compression member as will be apparent from the description below. Frustoconical washer 126 has an inclined camming surface 128.

In the position shown in FIG. 4, the sealing member 124 is in only light sealing engagement with the interior surface 4 of the duct 2, whilst the teeth 120 are not fully engaged with the surface 4.

A screw cap 130 is located on the threaded outer portion 108 of the shaft 104. The cap 130 has an annular recess 132 in which is seated the domed end 134 of the shaft. In the relaxed non-gripping position, the domed end 134 is recessed with respect to the end 138 of the cap 130.

In order to tighten the plug and bring the collet teeth 120 into biting engagement with the surface 4 of the duct, the end cap 130 is rotated (either clockwise or anti clockwise depending upon the direction of the thread) so that the shaft 104 is moved in a direction towards the end of the duct. As it moves, the washer 112 compresses the sealing member 124 against the surface 136 of washer 126, thereby squashing the sealing member against the surface 4 to provide a fluid tight seal. At the same time, the inclined camming surface 128 of the frustoconical washer 126 is urged against the camming surface 122 of the collet, which causes the gripping portion 120 of the collet to move radially outwardly, so that the teeth bite into the surface 4.

As the shaft 104 moves towards the end of the duct, the domed surface 134 moves to a position where it is flush with the curved surface 138 at the end of the cap 130.

This provides a visual indicator that the plug is in tight gripping engagement with the interior surface of the duct.

A major benefit of this design is that increased fluid pressures within the duct, which might otherwise force the plug out of the end of the duct, merely serve to cause the teeth of the collet 120 to dig into the duct more tightly. Consequently, the plug of the invention is capable of resisting high internal fluid pressures without being ejected. Plugs of the type shown in FIGS. 3 and 4 are particularly suitable for use with wider bore fibre optics ducts, for examples ducts having a nominal internal diameter of up to 10 mm or more.

The plugs described above in relation to the drawings are given as examples of plugs in accordance with the invention. It will readily be apparent that numerous modifications and alterations may be made to the plugs illustrated in the drawings without departing from the principles underlying this invention and all such modifications and alterations are intended to be embraced by this application.

The invention claimed is:

1. A plug for sealing an end of a duct, the plug comprising:
   a sealing member for sealing against an interior surface of the duct; and
   gripping means comprising one or more teeth for gripping the interior surface of the duct;
   wherein the plug comprises a pair of opposed camming surfaces arranged for relative axial movement therebetween whereby the relative axial movement results in the one or more teeth of the gripping means being urged radially outwardly into gripping engagement with the interior surface of the duct;
   wherein said plug further comprises a main body portion in the form of a shaft for insertion into the end of the duct, and a head portion connected to the shaft, wherein the head portion, in use, protrudes from an end of the duct, and wherein the relative axial movement of the pair of opposed camming surfaces is brought about by axial movement of the shaft; and
   wherein the shaft is provided with a pair of axially spaced apart compression members, each compression member extending radially outwardly from the shaft, wherein one of the compression members is fixed relative to the shaft and the other compression member is slidable with respect to the shaft; wherein the sealing member is mounted about the shaft between the two compression members so that the axial movement of the shaft compresses the sealing member between the two compression members to deform the sealing member into sealing contact with the interior wall of the duct.

2. A plug according to claim 1, wherein the duct comprises a circular cross section.

3. A plug according to claim 1, wherein the opposed camming surfaces are present on two separate components of the plug, the two components being arranged for relative axial movement therebetween, and wherein one of the camming surfaces is fixed and the other is movable.

4. A plug according to claim 1, wherein the camming surfaces are each inclined relative to an axis of the plug.

5. A plug according to claim 1, wherein the sealing member comprises an annular seal formed from an elastomeric material.

6. A plug according to claim 1 wherein the shaft has a camming member mounted thereon, the camming member providing one of the opposed camming surfaces.

7. A plug according to claim 6, wherein the gripping means is concentrically arranged about the shaft and comprises a gripping collar or collet which encircles the shaft, wherein the collar or collet comprises a radially inwardly facing camming surface and a radially outwardly facing gripping surface, whereby the axial movement of the shaft urges a camming surface of the camming member against the camming surface on the collar or collet thereby to force the gripping surface of the collar or collet outwardly and into gripping engagement with the interior surface of the duct.

8. A plug according to claim 1 wherein the axial movement of the shaft is brought about by means of a threaded connection between two components of the plug.

9. A plug according to claim 1, wherein the camming surfaces are configured such that the gripping member is urged into gripping engagement with the interior surface of the duct as the shaft is moved in a direction towards the end of the duct.

10. A plug according to claim 9, wherein the head portion of the shaft has a screw collar mounted thereon, wherein rotation of the screw collar promotes axial movement of the shaft in a direction towards the end of the duct.

11. A plug for sealing an end of a duct, the plug comprising:
a sealing member for sealing against an interior surface of the duct; and
gripping means comprising one or more teeth for gripping the interior surface of the duct;
wherein the plug comprises a pair of opposed camming surfaces arranged for relative axial movement therebetween whereby the relative axial movement results in the one or more teeth of the gripping means being urged radially outwardly into gripping engagement with the interior surface of the duct;
wherein said plug further comprises a main body portion in the form of a shaft for insertion into the end of the duct, and a head portion connected to the shaft, wherein the head portion, in use, protrudes from the end of the duct, and wherein the relative axial movement of the pair of opposed camming surfaces is brought about by axial movement of the shaft;
wherein the camming surfaces are configured such that the gripping member is urged into gripping engagement with the interior surface of the duct as the shaft is moved in a direction away from the end of the duct; and
wherein the shaft comprises a plunger which is pushed into the duct, wherein the axial motion of the shaft as it is pushed into the duct brings the two camming surfaces together so that the gripping teeth of the gripping means are urged radially outwardly into gripping engagement with the interior surface of the duct.

12. A plug according to claim 11, wherein a camming member is aligned alongside the shaft inside the duct, the camming member being offset from an axis of the plug.

13. A plug according to claim 12, wherein the camming member is provided with the one or more gripping teeth and thereby constitutes all or part of the gripping means.

14. A plug according to claim 12, wherein confronting surfaces of the camming member and shaft are configured to provide a ratchet mechanism, whereby the shaft can be moved from a first position, in which the gripping means does not exert a gripping effect, to a second position, in which the camming surfaces engage to urge the gripping teeth into gripping contact with the interior surface of the duct.

15. A plug for sealing an end of a duct, the plug comprising:
a sealing member for sealing against an interior surface of the duct;
gripping means comprising one or more teeth for gripping the interior surface of the duct;
a main body portion in the form of a shaft for insertion into the end of the duct, and a head portion connected to the shaft, the head portion, in use, protrudes from the end of the duct;
wherein the plug comprises a pair of opposed camming surfaces arranged for relative axial movement therebetween wherein the relative axial movement of the said pair of opposed camming surfaces is brought about by axial movement of the shaft which is brought about by rotation of a threaded screw collar mounted on the head portion of the shaft, whereby the relative axial movement results in the one or more teeth of the gripping means being urged radially outwardly into gripping engagement with the interior surface of the duct;
wherein said plug further comprises means for visually indicating when the plug is in a gripping configuration and when the plug is in a non-gripping configuration said means, comprising, when the plug is in a non-gripping configuration, the head portion is recessed relative to the screw collar and, when the plug is moved into a gripping configuration, the head portion is substantially flush with the screw collar.

16. A plug for sealing an end of a duct, the plug comprising:
a sealing member for sealing against an interior surface of the duct; and
gripping means comprising one or more teeth for gripping the interior surface of the duct;
wherein the plug comprises a pair of opposed camming surfaces arranged for relative axial movement therebetween whereby the relative axial movement results in the one or more teeth of the gripping means being urged radially outwardly into gripping engagement with the interior surface of the duct;
wherein said plug comprising:
a shaft for insertion into the end of the duct, a portion of the shaft having one or more gripping teeth thereon;
a sealing member disposed about an enlarged inner end portion of the shaft for sealing against the interior surface of the duct; and
a gripping member having one or more teeth for gripping the interior surface of the duct;
wherein the shaft and the gripping member comprise complementary camming surfaces such that axial movement of the shaft results in the gripping member and the teeth on the shaft being urged into gripping engagement with the interior surface of the duct, whereby the shaft has a plunger head at its outermost end and the plunger head is pushed to bring about axial movement of the shaft.

17. A duct for a fibre optic telecommunications cable fitted with a plug as defined in claim 1.

18. A network of ducts for a fibre optics telecommunications network comprising one or more plugs as defined in claim 1.

19. A duct for a fibre optic telecommunications cable fitted with a plug as defined in claim 11.

20. A network of ducts for a fibre optics telecommunications network comprising one or more plugs as defined in claim 11.

21. A duct for a fibre optic telecommunications cable fitted with a plug as defined in claim 15.

22. A network of ducts for a fibre optics telecommunications network comprising one or more plugs as defined in claim 15.

23. A duct for a fibre optic telecommunications cable fitted with a plug as defined in claim 16.

24. A network of ducts for a fibre optics telecommunications network comprising one or more plugs as defined in claim 16.

* * * * *